(12) United States Patent
Simon et al.

(10) Patent No.: US 12,055,674 B2
(45) Date of Patent: *Aug. 6, 2024

(54) X-RAY DOWNHOLE TOOL WITH AT LEAST TWO TARGETS AND AT LEAST ONE MEASUREMENT DETECTOR

(71) Applicant: Schlumberger Technology Corporation, Sugar Land, TX (US)

(72) Inventors: Matthieu Simon, Clamart (FR); Christian Stoller, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/120,788

(22) Filed: Dec. 14, 2020

(65) Prior Publication Data
US 2021/0096275 A1 Apr. 1, 2021

Related U.S. Application Data

(63) Continuation of application No. 15/196,255, filed on Jun. 29, 2016, now Pat. No. 10,866,337.

(51) Int. Cl.
*G01V 5/12* (2006.01)
*G01V 5/08* (2006.01)

(52) U.S. Cl.
CPC ............ *G01V 5/125* (2013.01); *G01V 5/08* (2013.01)

(58) Field of Classification Search
CPC ........... E21B 49/00; E21B 49/08; G01V 5/08; G01V 5/125
See application file for complete search history.

(56) References Cited

U.S. PATENT DOCUMENTS

| 3,840,746 | A | * | 10/1974 | Kehler | G01V 5/12 |
| | | | | | 378/160 |
| 5,627,368 | A | | 5/1997 | Moake | |
| 7,564,948 | B2 | | 7/2009 | Wraight et al. | |
| 7,960,687 | B1 | | 6/2011 | Simon et al. | |
| 8,173,953 | B2 | | 5/2012 | Stoller et al. | |
| 8,742,328 | B2 | | 6/2014 | Simon et al. | |
| 9,091,777 | B2 | | 7/2015 | Simon | |
| 10,866,337 | B2 | * | 12/2020 | Simon | G01V 5/08 |

(Continued)

OTHER PUBLICATIONS

International Search Report and Written Opinion issued in the related PCT Application PCT/US2017/038233, dated Sep. 28, 2017 (17 pages).

(Continued)

*Primary Examiner* — Chih-Cheng Kao
(74) *Attorney, Agent, or Firm* — Frederick Carbone

(57) ABSTRACT

The current disclosure is related to a downhole tool that comprises an electronic photon generator and at least one detector. The electronic photon generator comprises a cathode configured to emit electrons, a first target configured to generate photons when struck by the electrons, a second target configured to generate photons when struck by the electrons, and a beam steering device that directs the electrons to a first or second target. The at least one detector is configured to detect at least some of the photons emitted by the first target and at least some of the photons emitted by the second target.

16 Claims, 12 Drawing Sheets

(56) References Cited

U.S. PATENT DOCUMENTS

| | | |
|---|---|---|
| 2003/0048874 A1* | 3/2003 | Wilson .................. H01J 35/064 |
| | | 378/119 |
| 2003/0231739 A1 | 12/2003 | Rosner |
| 2004/0017889 A1 | 1/2004 | Kumakhov |
| 2006/0098776 A1 | 5/2006 | Burbury et al. |
| 2006/0104418 A1 | 5/2006 | Dunham et al. |
| 2007/0237303 A1 | 10/2007 | Birdwell et al. |
| 2009/0157317 A1* | 6/2009 | Case ........................ G01V 5/12 |
| | | 250/269.1 |
| 2010/0260317 A1* | 10/2010 | Chang .................... A61N 5/103 |
| | | 378/65 |
| 2011/0002443 A1 | 1/2011 | Wraight et al. |
| 2011/0049345 A1 | 3/2011 | Roberts |
| 2011/0206179 A1 | 8/2011 | Bendahan |
| 2014/0064456 A1 | 3/2014 | Zou et al. |
| 2014/0251690 A1* | 9/2014 | Simon ..................... E21B 17/16 |
| | | 175/50 |
| 2015/0055747 A1 | 2/2015 | Simon et al. |
| 2015/0124921 A1* | 5/2015 | Groves .................... G21G 4/04 |
| | | 376/160 |
| 2018/0003854 A1 | 1/2018 | Simon et al. |

OTHER PUBLICATIONS

International Preliminary Report on patentabiltiy issued in the related PCT Application PCT/US2017/038233, dated Jan. 1, 2019 (15 pages).

* cited by examiner

X-RAY DOWNHOLE TOOL WITH AT LEAST TWO TARGETS AND AT LEAST ONE MEASUREMENT DETECTOR

CROSS-REFERENCE TO RELATED APPLICATIONS

The present application is a Continuation Application of U.S. application Ser. No. 15/196,255 filed Jun. 29, 2016, which is incorporated herein in its entirety for all purposes.

BACKGROUND

This disclosure relates generally to a downhole tool that generates x-rays to measure formation properties and, more particularly, to a downhole tool that includes at least two targets to generate x-rays from different locations in the downhole tool.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of any kind.

To locate and extract oil, water, natural gas, or other liquids, a hole, referred to as a borehole, may be drilled into a surface of a geological formation. To form the borehole, a drill bit may excavate a portion of the geological formation. A drilling fluid, commonly referred to as "mud" or "drilling mud," may be pumped into the borehole, for example, to cool and/or lubricate the drill bit. Generally, the drilling mud may include solid particles, such as dirt, suspended in liquid, such as water. When the geological formation is porous, the liquid component of the drilling mud may be pushed into the geological formation, leaving the solid particles on the borehole wall. Over time, a layer of the solid particles, commonly referred to as "mud cake," may form along the wall of the borehole.

A formation density tool may be deployed within the sub-surface to measure physical properties of a surrounding geological formation. The formation density tool may be moved within a borehole drilled in the geological formation. For example, the formation density tool may be pushed farther into the borehole and/or pulled to remove it from the borehole. The formation density tool may include a source to emit high-energy photons into the geological formation. Some of the high-energy photons may interact with the geological formation and may then be detected by detectors on the formation density tool. The physical properties of the geological formation may be determined from the number and characteristics of the detected high-energy photons.

Because the photons interact at various depths of investigation (DOI) acquiring data associated with multiple DOIs may improve the accuracy of the determined physical properties of the geological formation. To acquire data at multiple DOIs, the formation density tool may include multiple detectors, such that each detector may provide data regarding an additional DOI. However, each of the detectors may include additional hardware that increases the complexity, cost, and may be difficult to accommodate given the space constraints of the formation density tool.

SUMMARY

In some embodiments, there is disclosed a downhole tool that comprises an electronic photon generator and at least one detector. The electronic photon generator comprises a cathode configured to emit electrons, a first target configured to generate photons when struck by the electrons, a second target configured to generate photons when struck by the electrons, and a beam steering device that directs the electrons to a first or second target. The at least one detector is configured to detect at least some of the photons emitted by the first target and at least some of the photons emitted by the second target.

The current disclosure also discloses an electronic photon generator comprising a cathode configured to emit electrons, a first target configured to generate photons when struck by the electrons, and a second target configured to generate photons when struck by the electrons.

A method is also disclosed, which comprises lowering a downhole tool into a wellbore penetrating a subterranean formation. The downhole tool comprises an electronic photon generator having a cathode configured to emit electrons, a first target configured to generate photons when struck by the electrons, a second target configured to generate photons when struck by the electrons, a beam steering device that is configured to direct the electrons to a first or second target, and a detector configured to detect at least some of the photons emitted by the first target and at least some of the photons emitted by the second target. The method further comprises directing photons emitted by the first target out of the downhole tool at a first location, directing photons emitted by the second target out of the downhole tool at a second location, and determining a property of the downhole tool, the wellbore or the subterranean formation based on signals detected from the photons emitted by the first and second targets.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
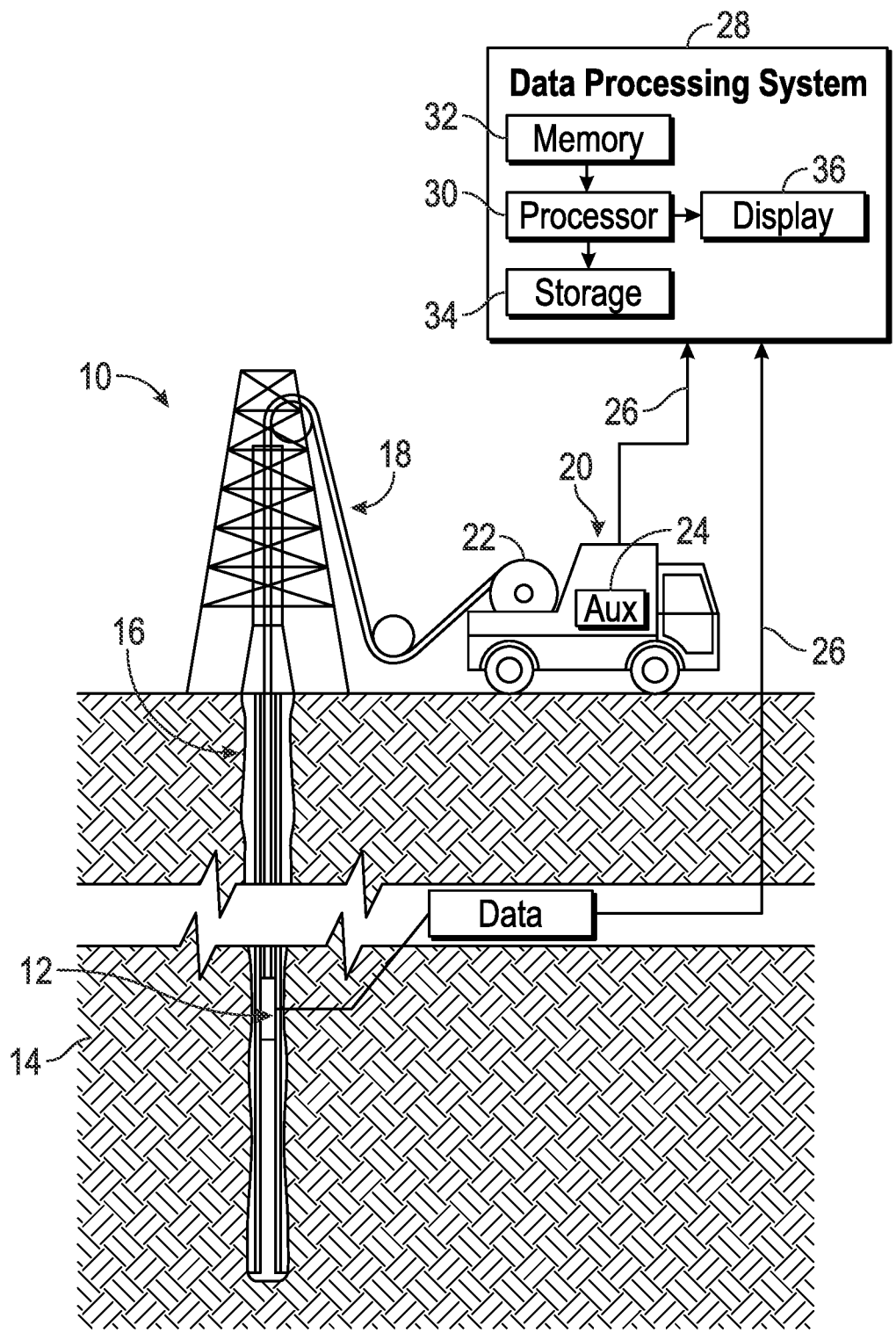
FIG. 1 is a schematic diagram of a drilling system that includes a downhole tool to detect characteristics of a geological formation adjacent to the downhole tool, in accordance with an embodiment.

One or more specific embodiments of the present disclosure will be described below. These described embodiments are examples of the presently disclosed techniques. Additionally, in an effort to provide a concise description of these embodiments, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates to a downhole tool that measures properties of a geological formation by steering an electron beam towards different targets to generate photonic radiation. In this disclosure, the photonic radiation is described as including a spectrum of x-rays, but any suitable form of photonic radiation may be generated. The different targets may have different locations within the downhole tool at different spacings from a detector. With different spacings of the targets from the detector, the downhole tool may acquire data at different depths of investigation (DOI). As described below, DOI refers to a depth or range of depths in a formation that is being probed by the photons. Thus, some embodiments of the downhole tool may avoid using more than one detector, yet still obtain measurements at different DOIs. However, more than one detector may be used if desired. The photonic radiation emitted by the downhole tool lends itself well to a formation density measurement. However, it should be understood that the downhole tool may obtain any suitable measurement and is not meant to be limited to measuring formation density. As such, this disclosure will refer to the downhole tool as a downhole formation density tool, but the disclosure should be understood to encompass downhole tools that generate photonic radiation using multiple possible targets.

The formation density tools of this disclosure may measure different DOIs using multiple spacings due to multiple targets, rather than or in addition to positioning different detectors at different distances from the source. For example, the system may have a short-spaced target located in closer proximity to the detector than a long-spacing target. The properties of the geological formation may be determined based on data related to the photons detected from each of the targets to the detector, which may include energy level of the detected photons and count rate of photons. The properties of the geological formation and the borehole in the formation may include for example a formation density, a formation photoelectric factor (PEF), a mud cake thickness, a mud cake density, and a mud cake PEF. The measurements of each of the properties may have varying sensitivities depending on the energy of the emitted or the detected photons, the count rate of the photons, the source-detector spacing, or the like. Using various data analysis techniques, such as spine-and-ribs techniques, forward model techniques, inversion techniques, neural networks, or other suitable approaches, a data processing system may determine the properties of the geological formation based on the energy of the detected photons (e.g., spectral information), the count rate of the detected photons, the DOI associated with the detected photons, or the like. As such, having data related to more than one DOI may improve the accuracy of the data produced using the various techniques.

Although additional detectors assist in data analysis, each detector adds additional complexity to the system and/or may take additional space within the tool. For example, each detector may include hardware, such as a scintillator, a photomultiplier tube, and a high voltage power supply connected to the photomultiplier tube. To gain information for each additional DOI, an additional detector may be added, thereby increasing the complexity and/or have additional radial or axial space in the downhole tool.

Thus, embodiments of the disclosure include a downhole tool having a detector used to acquire data from photons interacting with the geological formation at different DOIs. That is, the downhole tool may provide data at multiple DOIs without including additional detectors (e.g., additional scintillators, additional photomultipliers, etc.). For example, the downhole tool may include an electron accelerator within the downhole tool that accelerates electrons towards a selectable set of at least two targets. Each of the targets, which may be composed of different materials, have different collimation to direct the outgoing radiation or have different angles with respect to the electron beam, may emit photons (e.g., x-rays) of different energy when struck by the electrons. Thus, the different targets may cause photons to exit the downhole tool at different positions, different emission angles and, when the photons are detected by a photon detector (e.g., an x-ray detector), provide data relating to the formation at a different DOI. The downhole tool may also include a steering control system that steers the electron beam from the cathode towards a selected target. The electron beam impinges on the target and creates photons that interact with the geological formation at various depths of investigation.

With this in mind, FIG. 1 illustrates a well-logging system 10 that may employ the systems and methods of this disclosure. The well-logging system 10 may be used to convey a downhole tool 12 through a geological formation 14 via a wellbore 16. The downhole tool 12 is conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Although the downhole tool 12 is described as a wireline downhole tool, it should be appreciated that any suitable conveyance may be used. For example, the downhole tool 12 may instead be conveyed as a logging-while-drilling (LWD) tool as part of a bottom hole assembly (BHA) of a drill string, conveyed on a slickline or via coiled tubing, and so forth. For the purposes of this disclosure, the downhole tool 12 may be any suitable measurement tool that uses a detector to obtain measurements of properties of the geological formation 14.

As discussed further below, the downhole tool 12 may emit photons, such as x-rays, into the geological formation 14, which are detected by the downhole tool 12 as data 26 relating to the wellbore 16 and/or the geological formation 14. The data 26 may be sent to a data processing system 28. The data processing system 28 may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display the images generated by the processor 30. Part or all of the data processing system 28 may be located in the downhole tool, or may be a local component of the logging winch system 20, may be a remote device that analyzes data from other logging winch systems 20, may be a device located proximate to the drilling operation, or any combination thereof. In some embodiments, the data processing system 28 may be a mobile computing device (e.g., tablet, smartphone, or laptop) or a server remote from the logging winch system 20. In some embodiments, the processing system 28 and storage 34 and/or memory 32 may be located in the downhole tool. In some cases, the downhole tool 12 may not communicate with the surface unit or have limited communication and the recorded data may be retrieved from the tool memory 32 or storage 34 once the tool is returned to the surface.

Figure 2:
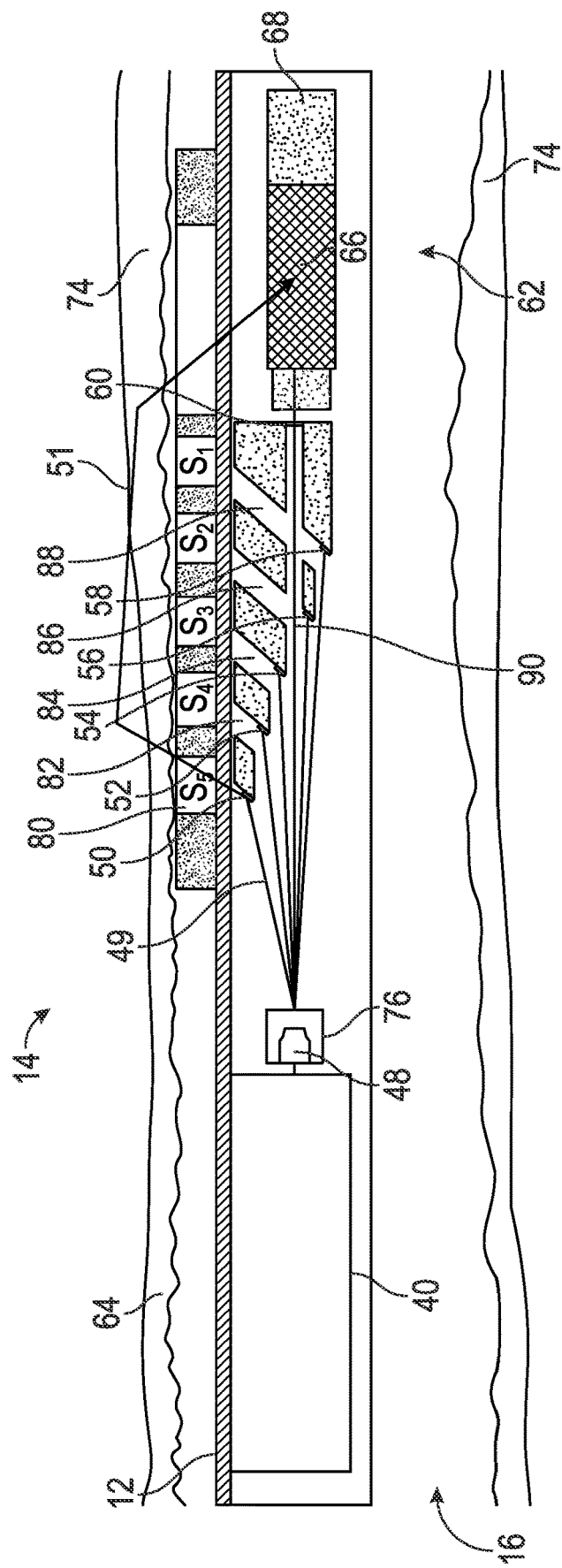
FIG. 2 is a schematic diagram of the downhole tool of FIG. 1 having a detector that detects photons of multiple depths of investigation (DOIs) from multiple targets on a first side of the downhole tool, in accordance with an embodiment.

FIG. 2 is a schematic diagram of the downhole tool 12 that detects physical characteristics of the geological formation 14. The downhole tool 12 may include a voltage generator 40 that may generate voltages of 150 kV, 200 kV, or any other voltage suitable to form an electric field and electrical potential difference between a cathode 48 and different targets (e.g., anodes). In the illustrated embodiment, the downhole tool 12 includes six targets 50, 52, 54, 56, 58, and 60. While FIG. 2 includes six targets 50, 52, 54, 56, 58, and 60, this is meant to be illustrative and the downhole tool 12 may include any suitable number of targets.

To determine the properties of the geological formation 14, the downhole tool 12 may emit photons into the geological formation 14 to interact with the geological formation 14 which then are detected by a detector 62. For example, the cathode 48 may emit electrons in an electron beam 49 (i.e., stream of electrons) between the cathode 48 and the first target 50. Due to a voltage difference between the cathode 48 and the first target 50, the electrons of the electron beam 49 may travel from the cathode 48, through the electric field, to the first target 50.

As the electrons in the electron beam 49 decelerate due to contacting (e.g., colliding with) the first target 50, which may be gold (Au), Tungsten, or the like, the deceleration may cause photons 51, such as high-energy photons (e.g., X-rays) to be emitted as Bremsstrahlung radiation. At least some of the photons 51 may be high-energy photons at an energy sufficient to cause at least a portion of the photons 51 to elastically (e. g. Compton scatter) scatter off electrons of the geological formation 14 and to interact with a detector 62 (e.g., through Compton scattering or photoelectric absorption), such as an x-ray detector. The detector 62 may include a scintillator 66 that detects the photons 51 and emits light based on the energy deposited by the interaction of the photons 51. For example, each emission of light may count as a detected photon (e.g., thereby adding one to a number of counts of the detector 62). Further, the detector 62 may include a photomultiplier 68 (or other suitable photon detector) operatively coupled to the scintillator 66 to detect the light emitted by the scintillator 66. The photomultiplier 68 may output an electrical signal from the detected light of the scintillator 66 to the data processing system 28. As mentioned above, the data processing system 28 may process the electrical signals from the photomultiplier 68 at the surface (e.g., as the data 26), at the downhole tool 12, or a combination thereof. As such, the downhole tool 12 may include hardware similar to the data processing system 28 (e.g., processor 30, memory 32, storage 34, etc.) In some embodiments, the detector 62 may be communicatively coupled to the data processing system 28 to communicate the data 26 related to the electrical signals indicative of the detected photons 51.

The photon or x-ray detection system is not limited to a scintillation detector system, wherein the scintillation detector is coupled to a photomultiplier. The photomultiplier could be replaced by any other photon detector suitable to detect the scintillation light and converting it into an electrical signal. Also, the entire detector could be a solid state detector such as a silicon detector, a silicon carbide (SiC) detector, Cadmium Zinc Telluride (CZT) detector to name a few. In yet another approach the detector could be a gas detector such as a high pressure Xe-filled proportional counter or an ionization chamber.

As mentioned above, during the drilling process, drilling fluid, commonly referred to as "mud" or "drilling mud," may be pumped into the borehole, for example, to cool and/or lubricate the drill bit. Over time, a layer of the solid particles, commonly referred to as "mud cake," may form along parts of the wall of the borehole due to the drilling mud. In the illustrated embodiment, the borehole 16 includes mud cake 74 between the downhole tool 12 and the geological formation 14. The data processing system 28 may determine the properties of the geological formation 14 and/or the mud cake 74, such as such as formation density, formation photoelectric factor (PEF), mud cake thickness, mud cake density, and mud cake PEF, based at least in part on characteristics of photons 51 detected by the detector 62. The PEF may indicate the lithology (e.g., composition) of the formation, such as the type of rocks. The data processing system 28 may receive data from the detector 62 indicating count rates and/or energy levels of the photons 51 at the detector 62. Each of the properties of the geological formation 14 and/or the mud cake 74 may have varying sensitivities to the photons 51. For example, the count rate of photons 51 at lower energies may depend more on the type of rock of the geological formation 14, characterized by the PEF, of the geological formation 12. Conversely, the count rate of photons 51 at higher energies may depend more on the electron density of the geological formation 14 than the count rate of the photons 51 at lower energies. The data processing system 28 may determine the properties of the geological formation 14 based on count rates of photons at various energies indicative of the interaction of photons with the elements in the formation. For example, the data processing system 28 may use spine-and-ribs techniques, forward model techniques, inversion techniques, neural networks, or other suitable approaches, to determine the properties of the geological formation 14 and the mud cake 74.

To improve the accuracy of the values of the properties of the geological formation 14 and/or the mud cake 74 determined by the data processing system 28, the processing system 28 may acquire data from the detector 62 at the different DOIs. For example, information at different DOIs may make inversion more robust and create new perspectives for more complex techniques, such as 3-layer inversion or radial profiling of density and/or PEF. For instance, information at various DOIs may enable better techniques in cased holes in the presence of a casing, a cement layer and the formation behind. As mentioned above, conventional systems may include multiple detectors at different distances from the source to provide multiple DOIs. However, each of the additional detectors may include additional hardware (e.g., scintillator, photomultiplier tube, etc.) thereby increasing the complexity of the downhole tool and taking additional space within the tool where axial and radial space is limited.

In the illustrated embodiment, the downhole tool 12 includes targets 50, 52, 54, 56, and 58 that direct photons 51 into the geological formation 14 as well as a target 60 that creates photons 51 within the downhole tool 12 to serve as an internal reference. To acquire data regarding at least two DOIs within the geological formation 14, the downhole tool 12 may include an electron beam steering system 76 that steers the electrons of the electron beam 49 towards each of the targets 50, 52, 54, 56, and 58. For example, the electron beam steering system 76 may steer the electron beam 49 by inducing an electric field in a direction perpendicular to the x-ray tube axis using electrodes at a variable potential to direct the electrons towards the first target 50. That is, the electron beam steering system 70 may apply a voltage to control a direction of the electric field between the cathode 48 and the targets 50, 52, 54, 56, and 58 to steer the electron beam 49 towards the first target 50. Further, the data processing system 28 may send signals to adjust the electric field generated by the electron beam steering system 76 to steer the beam 49 towards the second target 52 that corresponds to a second DOI, which is different from the first DOI of the first target 50. This process may be performed for each of the five different targets 50, 52, 54, 56, and 58 corresponding to five different DOIs. In certain embodiments, an isolation transformer having a primary coil at a ground potential on the outside of insulation of the downhole tool 12 and a secondary coil inside the insulation may be used. The AC voltage at the output of the secondary coil may be rectified and the rectified and smoothed voltage may be used to control the direction of electrons of the electron beam 49 by applying the voltage between the electrostatic deflector electrodes 118. In some embodiments, the electron beam steering system 70 may steer the electron beam 49 emitted by the cathode 48 by modulating the input voltage on the primary to obtain a variable deflection voltage on the deflector electrodes 118 without rectifying. In this case, one may be sweeping over all the deflection angles in a continuous way or in predetermined steps. In certain embodiments, the electron beam steering system 70 may steer the electron beam 49 by applying a magnetic field via one or more coils proximate to the cathode 48. These coils will advantageously be outside of the electrical insulation surrounding the photon generating tube, but may also be placed inside such insulation. While these are provided as examples, the electron beam steering system 70 may steer the electron beam 49 using any suitable method to control the direction of electrons of the electron beam 49. It should be understood that while the present embodiment indicates steering in a single plane across the axis of the generator tube deflection could be at any azimuthal angle. This may be achieved through the use of a second set of deflection electrodes, create an electric deflection field perpendicular to the one generated by the first set of deflector electrodes 118.

The downhole tool 12 may be configured such that each of the targets 50, 52, 54, 56, and 58 may be used to obtain radiation with the desired DOIs. For example, each of the targets 50, 52, 54, 56, and 58 may have respective collimation channels 80, 82, 84, 86, and 88 to obtain the desired sensitivities to density, PEF or borehole and borehole fluid properties, as a function of DOI. Further, some or all of the targets 50, 52, 54, 56, 58, and 60 may be at the same voltage potential or at different voltage potentials. The collimation channels 80, 82, 84, 86, and 88 may form a tube with a trapezoidal cross section along the tube axis or any other suitable shape to include an angular opening to have collimation openings such that the opening is surrounded mostly or completely by tungsten (or other dense high Z materials). The shape of the hole may have a smaller or larger angular aperture depending on the desired configuration, e.g. the desired DOI and/or a desired upper limit of the count rate in the detector.

The downhole tool 12 may include a collimation channel 90 within the downhole tool 12 to enable the electron beam 49 to contact an internal target 60 and direct photons 51 internally (e.g., within the downhole tool 12) to the detector 62 to serve as a reference to regulate the generator 40 and/or the detector 62. That is, the electron beam steering system 76 may direct the beam toward the target 60 using any suitable method described above. The generator 40 may be regulated by measuring a current on the target 60 and the spectrum itself or a total count of the spectrum via the detector 62. The material (e.g., tungsten) of the target 60 may filter the low energies of photons 51 from the spectrum. For example, the data processing system 28 may regulate the generator 40, as set forth according to the techniques disclosed by U.S. Pat. No. 7,960,687, entitled "Sourceless Downhole X-ray Tool" and filed on Sep. 30, 2010, which is incorporated by reference herein in its entirety.

Figure 3:
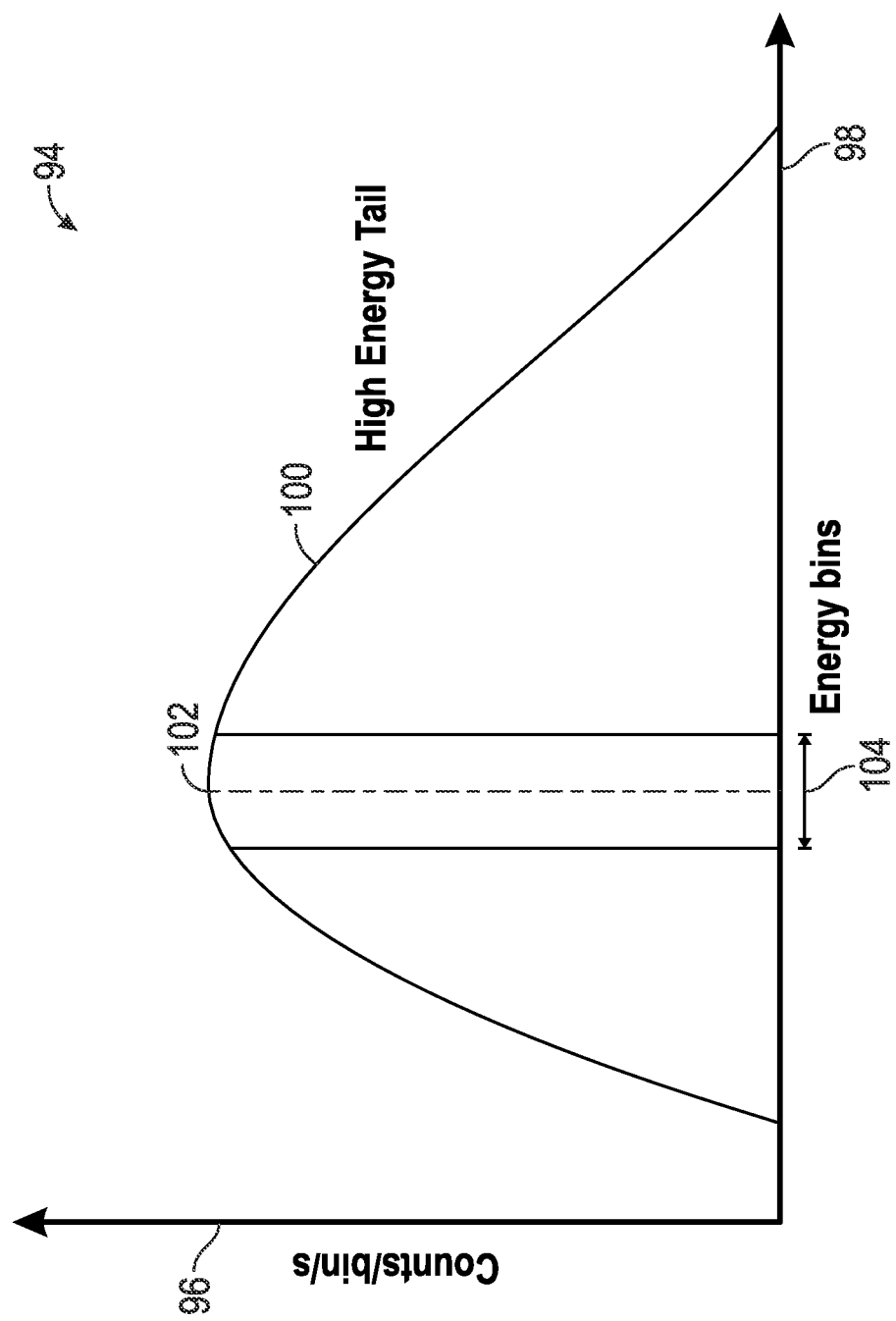
FIG. 3 is a graph of data received by the detector of FIG. 2 having an energy profile with a centroid within a window of energy, in accordance with an embodiment.

FIG. 3 is a graph 94 illustrating data received by the data processing system 28 related to the photons 51 detected by the detector 62 from the target 60 within the downhole tool 12. While the graph 94 may be displayed on the display 36, in certain embodiments, the data processing system 28 may process the data without displaying the graph 94. The graph 94 shows an ordinate 96 representing counts of photons per second (cps) and an abscissa 98 representing energy levels of the photons 51. The spectrum 100 detected by the detector 62 has attenuated low energies of photons 51 due to filtering from the target 60 material (e.g., tungsten). To regulate the gain of the detector 62, the data processing system 28 may send signals to the detector 62 to adjust a voltage on the photomultiplier tube 68 to control a centroid 102 of the detected photon spectrum 100, such that the centroid 102 is within a channel 104.

Figure 4:
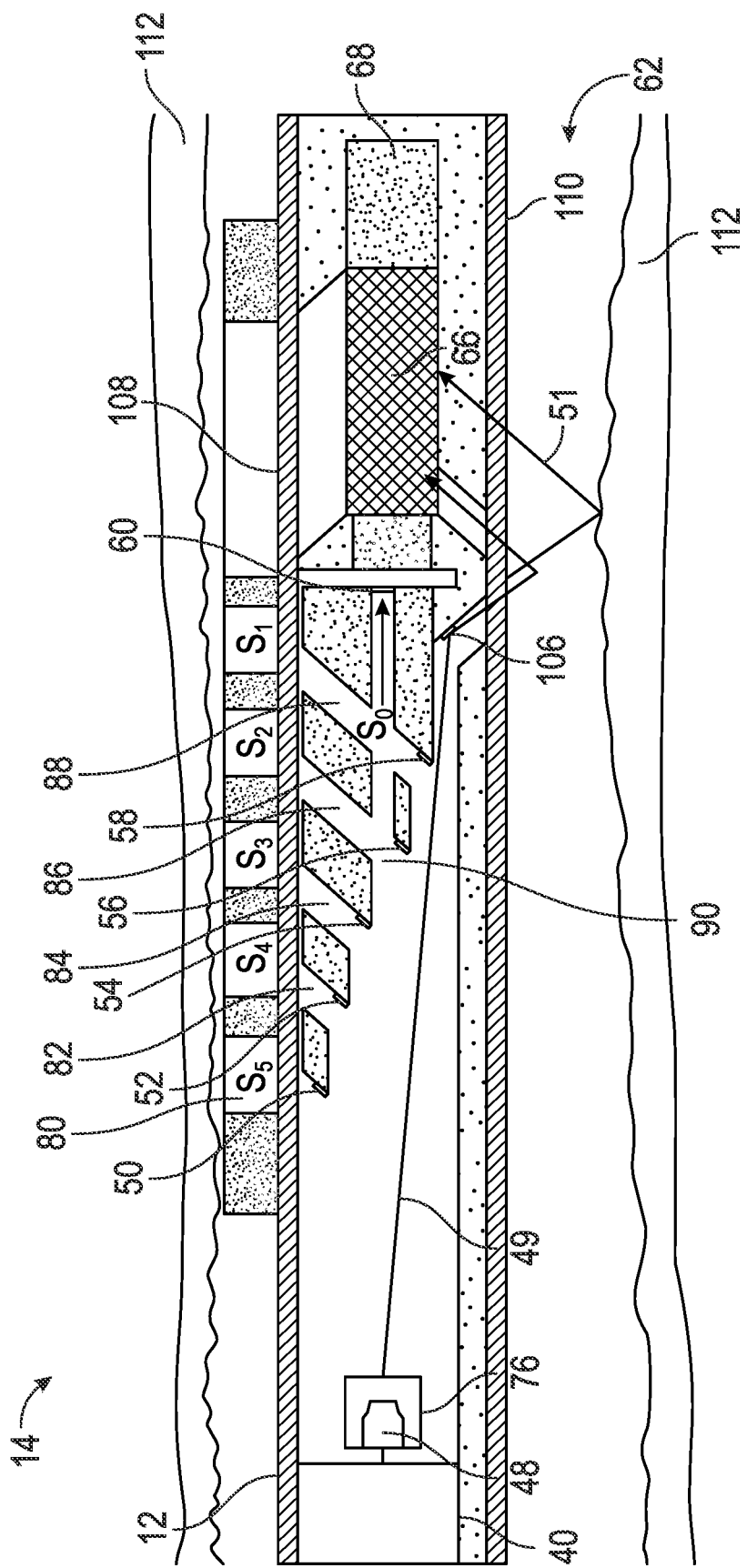
FIG. 4 is a schematic diagram of the downhole tool of FIG. 1 having a target on a second side of the downhole tool, in accordance with an embodiment.

FIG. 4 is directed to the downhole tool 12 having a mud property detection target 106, in accordance with an embodiment. The downhole tool 12 may include similar targets as those described with respect to FIG. 2 on a first side 108 of the downhole tool 12. Additionally, the downhole tool 12 includes the mud property detection target 106 on a second side 110 of the downhole tool 12, which may be opposite the first side 108, to enable shallow detection of mud properties (e.g., density and PEF), on the downhole tool 12. This can be useful in inversion techniques to detect the presence of Barite in the mud and therefore in the mud cake 112 and may be used to account for the impact of these properties on the formation property measurement.

Figure 5:
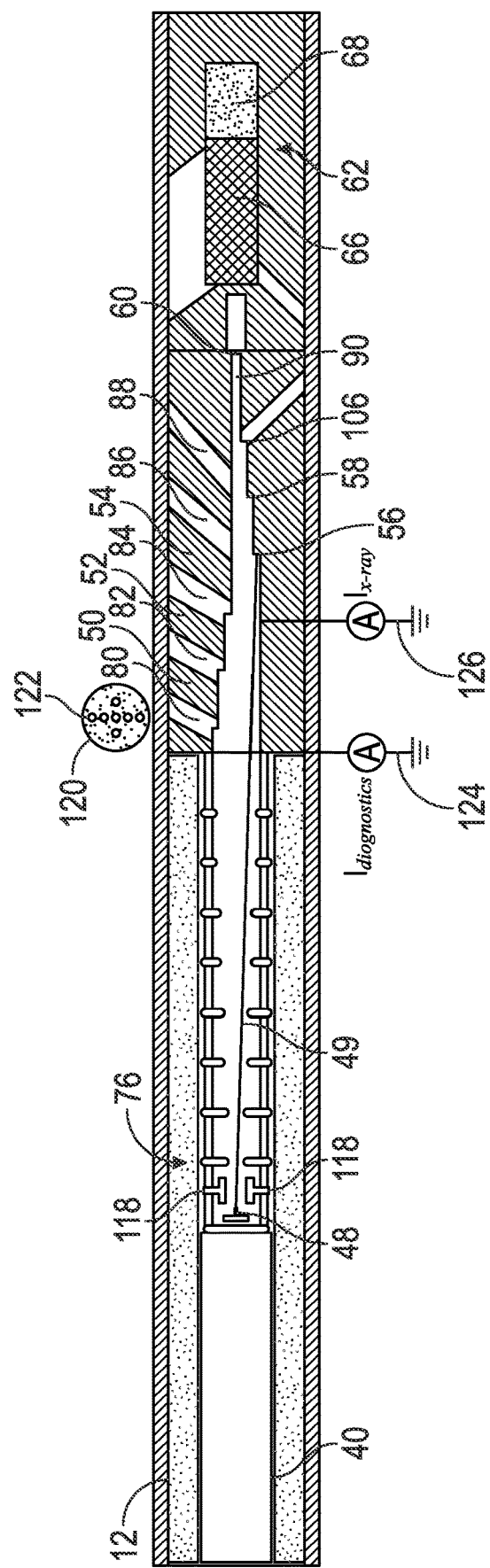
FIG. 5 is a schematic diagram of another downhole tool of FIG. 1 that uses an electrode to steer the beam between multiple targets to acquire data from multiple DOIs through a limiting aperture electrode, in accordance with an embodiment.

As explained above, the downhole tool 12 may include the steering control system 76 to steer the electron beam 49. FIG. 5 is a schematic diagram of the downhole tool 12 that steers the electron beam 49 using electrostatic beam steering electrodes 118, in accordance with an embodiment. The downhole tool 12 may include at least one limiting aperture electrode 120 disposed between the cathode 48 and the targets 50, 52, 54, 56, 58, 60, and 106 to ensure that the portion of the electron beam 49 that does not contact the limiting aperture electrode 120 instead contacts the selected target. In the illustrated embodiment, the limiting aperture electrode 120 includes apertures 122 corresponding to each of the targets 50, 52, 54, 56, 58, 60, and 106. That is, the apertures 122 are disposed on the aperture electrode 120 such that the electron beam 49 passes through the aperture 122 to contact the selected target without contacting the limiting aperture electrode 120. The apertures 122 may be aligned or distributed throughout a plane, as illustrated in FIG. 5. While multiple apertures 122 are disposed on the single limiting aperture electrode 120 in the illustrated embodiment, in other embodiments, individual limiting aperture electrodes may be used on each of the targets 50, 52, 54, 56, 58, 60, and 106. The apertures in the one or more limiting aperture electrodes may be circular or may have any other shape suitable to insure that, when properly deflected, the beam passes through the respective aperture, while few if any electrons get intercepted by the electrode. The aperture electrode may be shaped and/or biased in such a way as to insure an accurate current measurement by limiting secondary electron emission or collection of scattered electrons from a target or other electrodes. This allows an accurate measurement of the electron current on the aperture electrode.

The downhole tool 12 may include a current sensor 124 disposed on the limiting aperture electrode 120 to measure the current $I_{DIAGNOSTICS}$ from the electron beam 49 that contacts the limiting aperture electrode 120. The limiting aperture electrode 120 may be composed of a low-Z material, such as Beryllium, to limit an amount of undesired X-rays while the electron beam 49 hits the electrode. Moreover, the downhole tool 12 may include another current sensor 126 coupled to the targets 50, 52, 54, 56, 58, 60, and 106 to measure the current $I_{XRAY}$ from the electron beam 49 that contacts the targets 50, 52, 54, 56, 58, 60, and 106.

Figure 6:
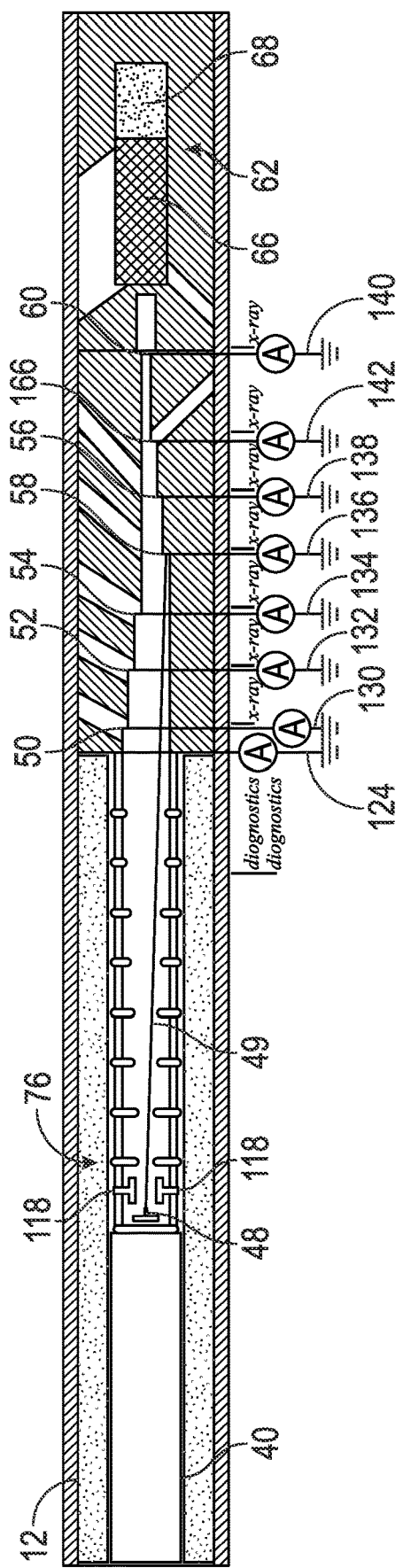
FIG. 6 is a schematic diagram of another downhole tool of FIG. 1 that includes multiple current sensors to detect current from electrons contacting the targets of the downhole tool, in accordance with an embodiment.

FIG. 6 is a schematic diagram of another embodiment of the downhole tool 12 that includes current sensors 130, 132, 134, 136, 138, 140, and 142 disposed on each of the targets 50, 52, 54, 56, 58, 60, and 106, respectively. Moreover, the current sensors 130, 132, 134, 136, 138, 140, and 142 may measure the current on the respective targets 50, 52, 54, 56, 58, 60, and 106. Further, the data processing system 28 may receive signals from each of the current sensors 130, 132, 134, 136, 138, 140, and 142. This may be used to determine which target 50, 52, 54, 56, 58, 60, and 106 is being contacted by the electron beam 49.

Figure 7:
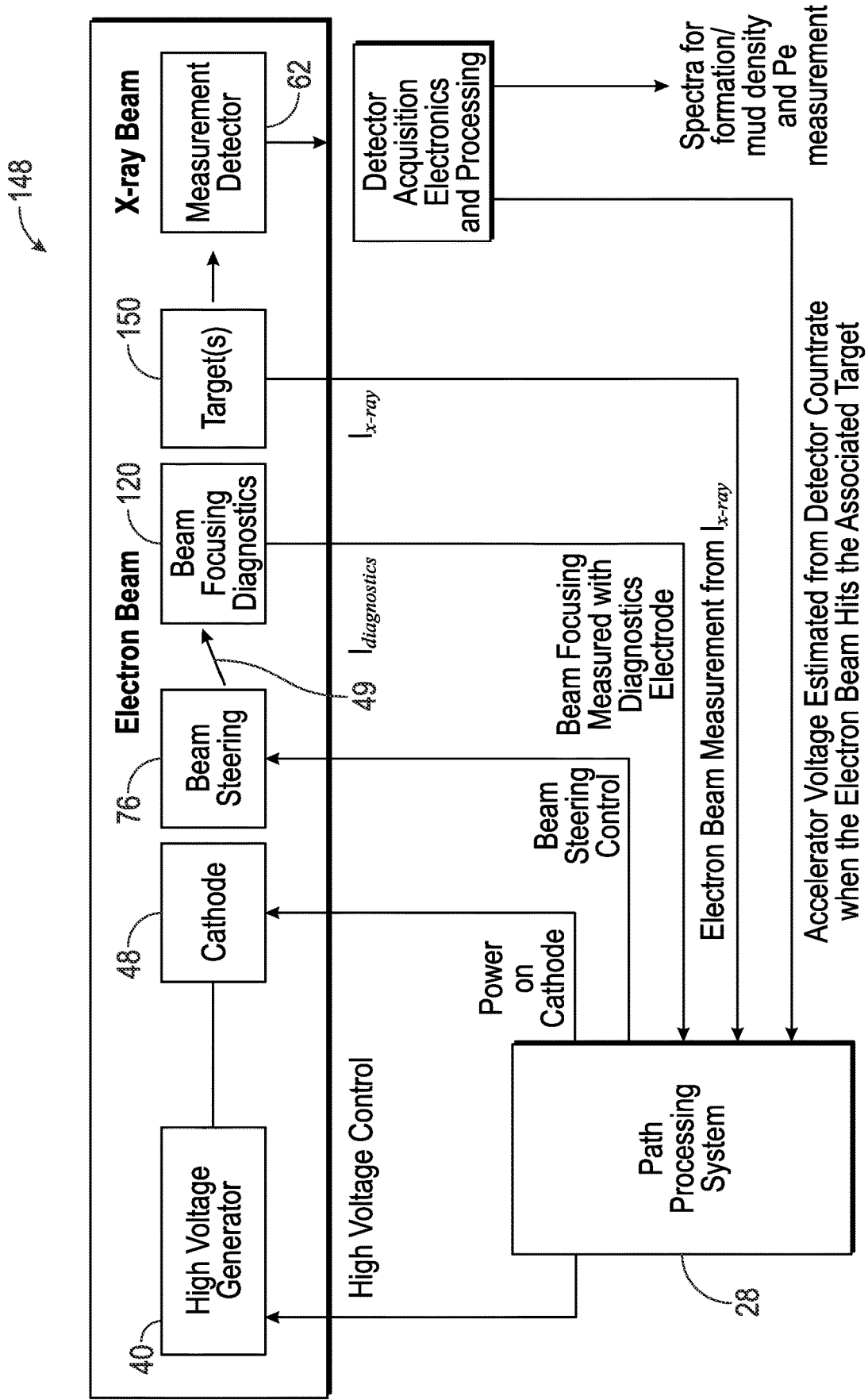
FIG. 7 is a block diagram of a control system that sends signals to control an electron beam of the downhole tool of FIG. 1 to contact multiple targets, in accordance with an embodiment.

FIG. 7 is a schematic diagram of an embodiment of a control system 148 that controls the electron beam and beam steering system 76 to acquire the properties of the geological formation 14 and/or mud cake 74. The control system 148 may include the data processing system 148 or another processing system. Moreover, the control system 148 may send signal(s) indicating instructions to control the electron beam steering system 76, such as the voltage across the electrostatic beam steering electrodes 118. In addition, the knowledge of which target is contacted by the beam is used in the processor to associate count rates and/or spectra with the correct target-source spacing or DOI.

Depending on the direction of the electron beam 49, some of the electrons may contact the limiting aperture electrode 120, and thereby cause the current $I_{DIAGNOSTICS}$ to increase. Some or all of the electrons may pass through one of the apertures 122 and contact the corresponding target 50, 52, 54, 56, 58, 60, or 106, thereby causing the current $I_{X-RAY}$ to increase. The sensors 124, 130, 132, 134, 136, 138, 140, and 142 may send signals indicating the currents $I_{DIAGNOSTICS}$ and $I_{X-RAY}$ to the processing system 28. The processing system 28 may send signals to control the beam position to contact the selected target based on the currents $I_{DIAGNOSTICS}$ and $I_{X-RAY}$. For example, the control system may control the electron beam 49 based at least in part on the following equation:

$$F = I_{X-RAY}/I_{BEAM} \quad (1)$$

where $I_{X-RAY}$ is the current on the selected target, $I_{BEAM}$ is the total current emitted by the cathode (e.g., $I_{X-RAY}$ + $I_{DIAGNOSTICS}$), and F is the feedback value. That is, the data processing system 28 may send signals to the electron beam steering system 76 in a direction that increases the feedback value (e.g., maximizes at one). For example, the data processing system 28 may send signals to control the electron beam steering system 76 to cause the electron beam to be directed to the selected target (e.g., feedback value F of one or close to one). Further, the control system 148 may control the voltage of the voltage generator 40 as well as send signals to power the cathode 48 (e.g., based on photons 51 detected when using the internal target 60). As mentioned above, the X-ray intensity may be maintained by regulating $I_{X-RAY}$ with the power on the cathode 48. Further, the X-ray energy is maintained by determining the x-ray spectrum on detector 62 while the electron beam is directed on the monitoring target 60. It is during this same period of time that the gain of the detector 62 may be regulated based on the detected spectrum 94 of FIG. 3. In another embodiment gain regulation may be done using internal radioactivity of the scintillation material as shown in U.S. Pat. No. 8,173, 953, the entire contents of which are incorporated by reference into the current disclosure.

In some embodiments, the targets 50, 52, 54, 56, 58, 60, and 106 may be positioned at an angle to limit the impact of the beam spot position on the measurement. The angle may be different for the different targets 50, 52, 54, 58, 60 and 106.

Figure 8:
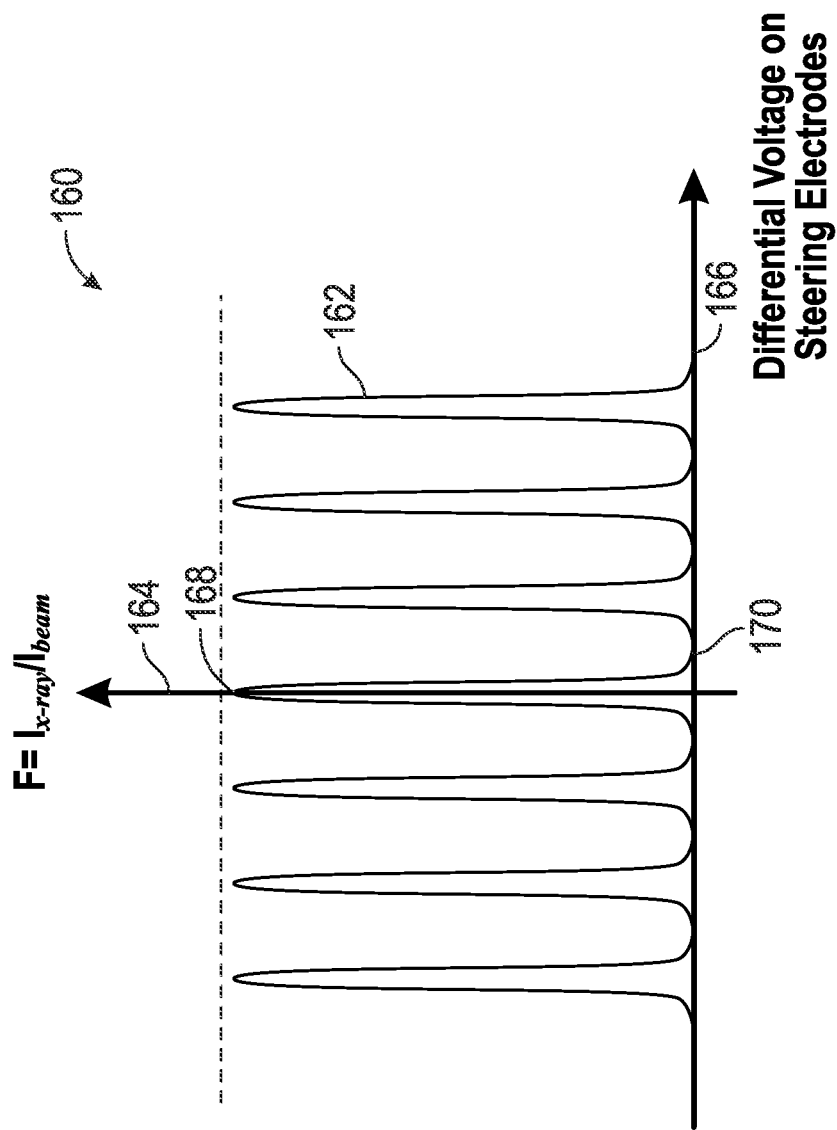
FIG. 8 is a graph of data received by current sensors corresponding to targets of the downhole tool of FIG. 1, in accordance with an embodiment.

FIG. 8 is a graph 160 of a profile 162 of the F-ratio due to the currents $I_{DIAGNOSTICS}$ and $I_{X\text{-}RAY}$ while steering the beam between each of the targets 50, 52, 54, 56, 58, 60, and 106. In the graph 160, an ordinate 164 represents the magnitude of the F value and an abscissa 166 represents the deflection voltage between the deflection plates. As the electron beam 49 contacts the first target 50, the profile 162 of the F ratio may include a local maximum 168 in which more of the current contacts the first target 50 than the limiting aperture electrode 120. After a certain duration, the data processing system 28 may send signals to the electron beam steering system 76 to steer the electron beam 49 to the second target 52. While the electron beam 49 is changing directions, the profile 162 includes a local minimum 170 in which some or all of the current contacts the limiting aperture electrode 120 before contacting the second target 52. Additional local minima and local maxima are shown in the profile 162 as the electron beam 49 is steered towards the subsequent targets 54, 56, 58, 60, and 106. The dashed line 172 in the graph indicates the maximum possible ratio of 1, where all of the beam is hitting one of the targets and no current is intercepted by an aperture electrode.

Figure 9:
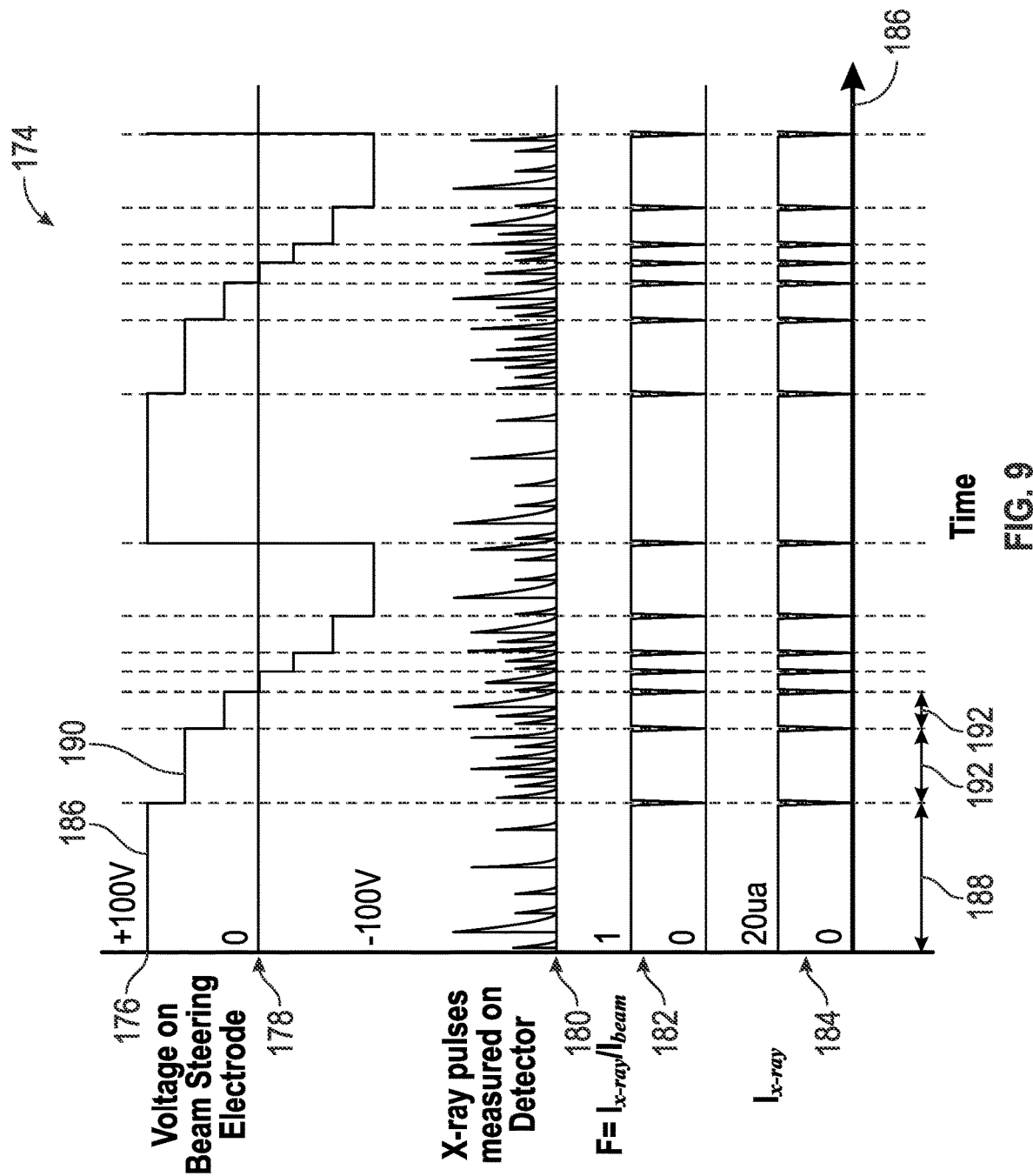
FIG. 9 is a graph of data of received by the detectors and sensors of the downhole tool of FIG. 1 used to steer an electron beam towards multiple targets, in accordance with an embodiment.

FIG. 9 is a graph 174 of signals received by the data processing system 28 from the detector 62 and the total current measured on targets 50, 52, 54, 56, 58, 60, and 106, in accordance with an embodiment. While the graph 174 may be shown on the display 36, this is meant to be illustrative and the data processing system 28 may receive and process the signals without displaying the graph 174. In the graph 174, an ordinate 176 represents magnitudes of various subsections 178, 180, 182, and 184, and an abscissa 186 represents time.

To steer the electron beam 49, the data processing system 28 may send signals to cause voltages differences between the electrodes 118 as shown in the first subsection 178. For example, the data processing system 28 may send a signal to cause a first voltage 186 across the electrodes 118 for a first duration 188 to direct the electron beam 49 to contact the first target 50. The data processing system 28 may send a second signal to cause a second voltage 190 across the electrodes 118 for a second duration 192 to direct the electron beam 49 to contact the second target 52. This process may continue with the data processing system 28 sending signal(s) to control the voltage across the electrodes 118 for different durations to direct the electron beam 49 to contact the internal target 60, targets 56, 58, and the mud property detection target 106. In the illustrated example, the data processing system 28 may send signals to the electron beam steering system 76 to steer the electron beam 49 from the targets in close proximity to the first side 108 to the targets in close proximity to the second side 110.

In some embodiments, the data processing system 28 may send signal(s) to steer the electron beam steering system 76 to steer the electron beam 49 on each target 50, 52, 54, 56, 58, 60, and 106 for a duration associated with the statistics from the measurements received at the detector 62. For example, the electron beam steering system 76 may be steering the electron beam toward each target depending on whether the measurement statistics for a given target position with a shorter or longer accumulation time. In many cases, the counting statistics will be poorer for a deeper depth of investigation (larger spacing between target and detector) and acquisition at a deeper DOI may have a longer duration of the respective target exposure.

As shown in subsections 182 and 184 of the graph 174, the feedback value as well as the $I_{X\text{-}RAY}$ value decreases to a local minimum between durations 188 and 192 because the electron beam steering system is steering the electron beam 49 between the first target 50 and the second target 52. As such, some electrons generate current on the limiting aperture electrode 120. At the second duration 192, the feedback value as well as $I_{X\text{-}RAY}$ increase to a local maximum due to the electrons contacting the second target 52. A typical electron current for this embodiment could range from about 5 μA to more than 100 μA.

Figure 10:
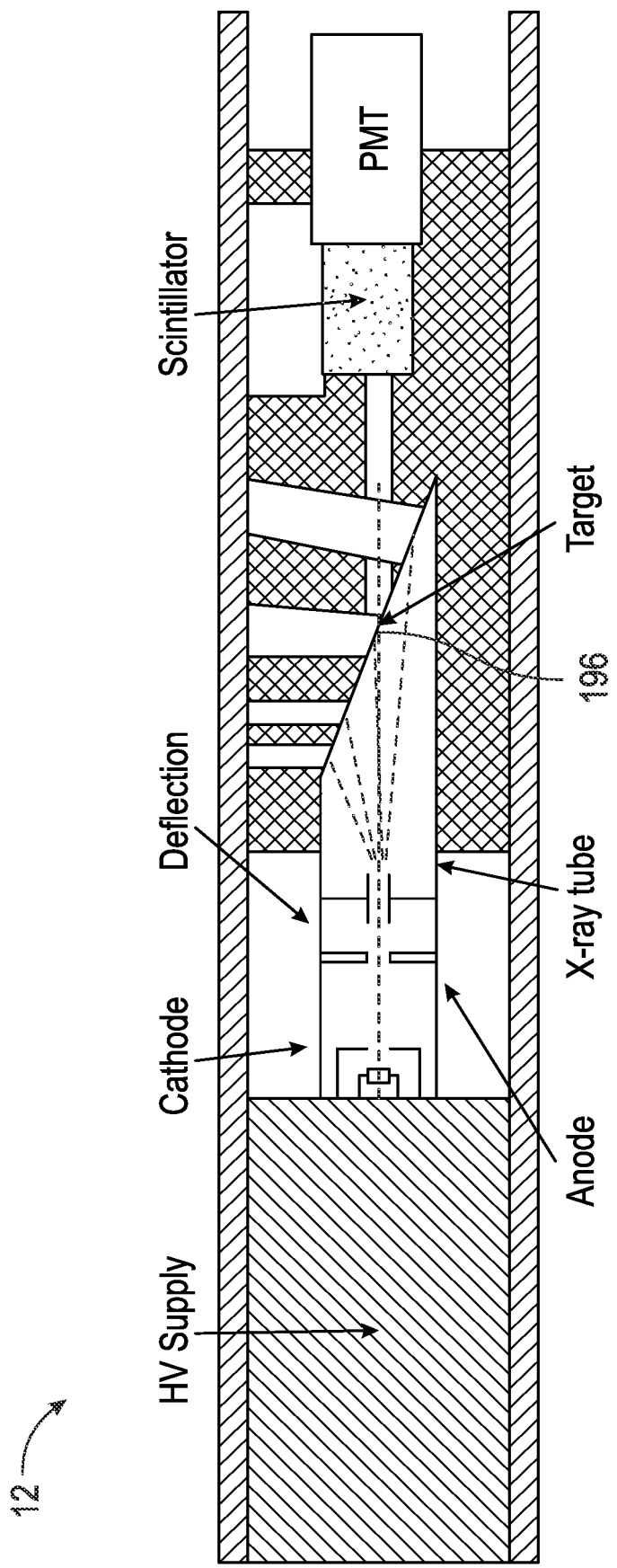
FIG. 10 is a schematic diagram of another embodiment of the downhole tool of FIG. 1, in accordance with an embodiment.

FIG. 10 is a schematic diagram of another embodiment of the downhole tool 12 that operates using transmission of X-rays in place of reflection. That is, the x-rays generated in the downhole tool 12 need to traverse the target after the emission and this alters the X-ray spectrum entering the collimation channels. For example, the downhole tool includes a target 196 that is outside of the collimation channels and the beam position on the target 196 is selected in such a way as to make sure that the resulting x-ray emission is guided into the collimation opening.

While a grounded target generator may be shown in the illustrated embodiments, this is meant to be illustrative, and the present disclosure may be applied to a bipolar generator or a grounded cathode generator as well. In an embodiment with a bipolar generator, the X-ray tube may include a limiting aperture having a low-Z material suitable for scattering X-ray beams (e.g., Beryllium) positioned in a middle of the X-ray tube and, in some embodiments, at or close to ground potential. For example, the limiting aperture may be positioned as set forth according to the techniques disclosed by U.S. Pat. No. 7,564,948, U.S. Patent Pub. 2015/0055747, which are incorporated by reference herein in their entirety. Further, in some density tools, there may be a desire for a window in the pressure housing (or drill collar) made of a low-Z/density material, such as Beryllium or Titanium) for each measurement detector. If the energy accelerator voltage in case of an x-ray generator is sufficient (e.g., above about 250 kV), there may not be a need to provide a window in the pressure housing for the exiting x-ray radiation.

Figure 11:
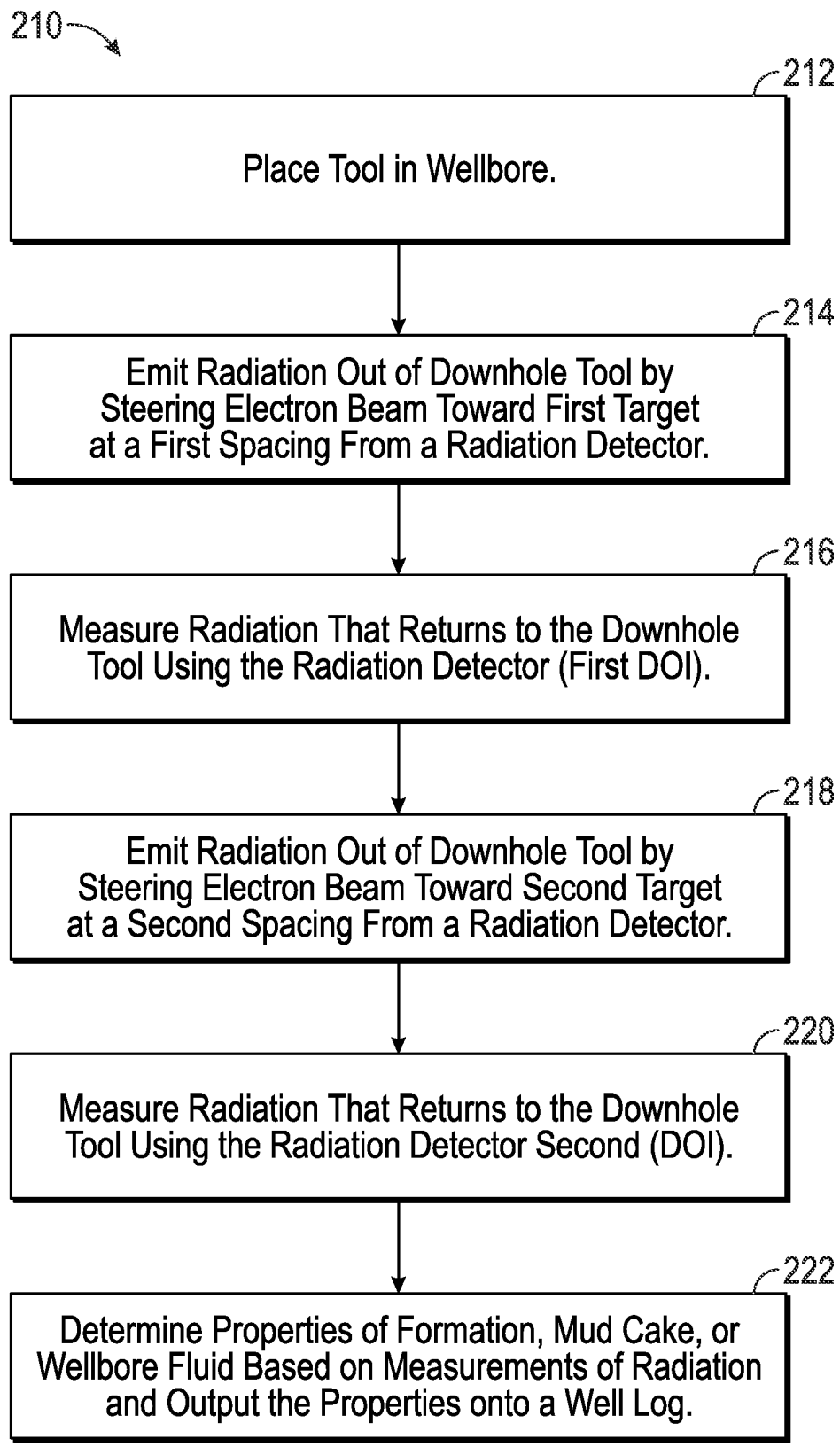
FIG. 11 is a flowchart of a method for obtaining measurements at two DOIs using radiation emitted by two targets at different times and detected by the same detector, in accordance with an embodiment.

Keeping the above in mind, FIG. 11 is a flowchart 210 representing a method for obtaining downhole properties using a downhole tool 12 having at least two targets (e.g., 50 and 52) that emit radiation with exit points from the downhole tool 12 at different spacings from a radiation detector 66. The downhole tool 12 may be placed in the wellbore (block 212) and an electron beam steered toward the first target (e.g., 50), causing radiation to be emitted out of the downhole tool 12 and toward the geological formation 14 (block 214). The detector 66 may detect the radiation that returns (block 216).

Because the detector 66 has a first spacing from the exit point where the radiation was emitted from the downhole tool 12 by the first target (e.g., 50), the radiation detected at block 216 may be understood to have penetrated the materials outside of the downhole tool 12 to a first depth of investigation (DOI). To measure a different DOI, the electron beam may be steered toward the second target (e.g., 52), causing radiation to be emitted out of the downhole tool 12 and toward the geological formation 14 from a different exit point and possibly at a different angle (block 218). The detector 66 may detect the radiation that returns (block 220), which may be understood to have probed to a second DOI. The measurements by the detector 66 based on radiation emitted from the two different targets (e.g., 50 and 52) at the first and second DOIs may be used to determine any suitable properties, such as density, of the geological formation 14, the mud cake, or wellbore fluid, which may be output to a well log for viewing by an operator (block 222).

Figure 12:
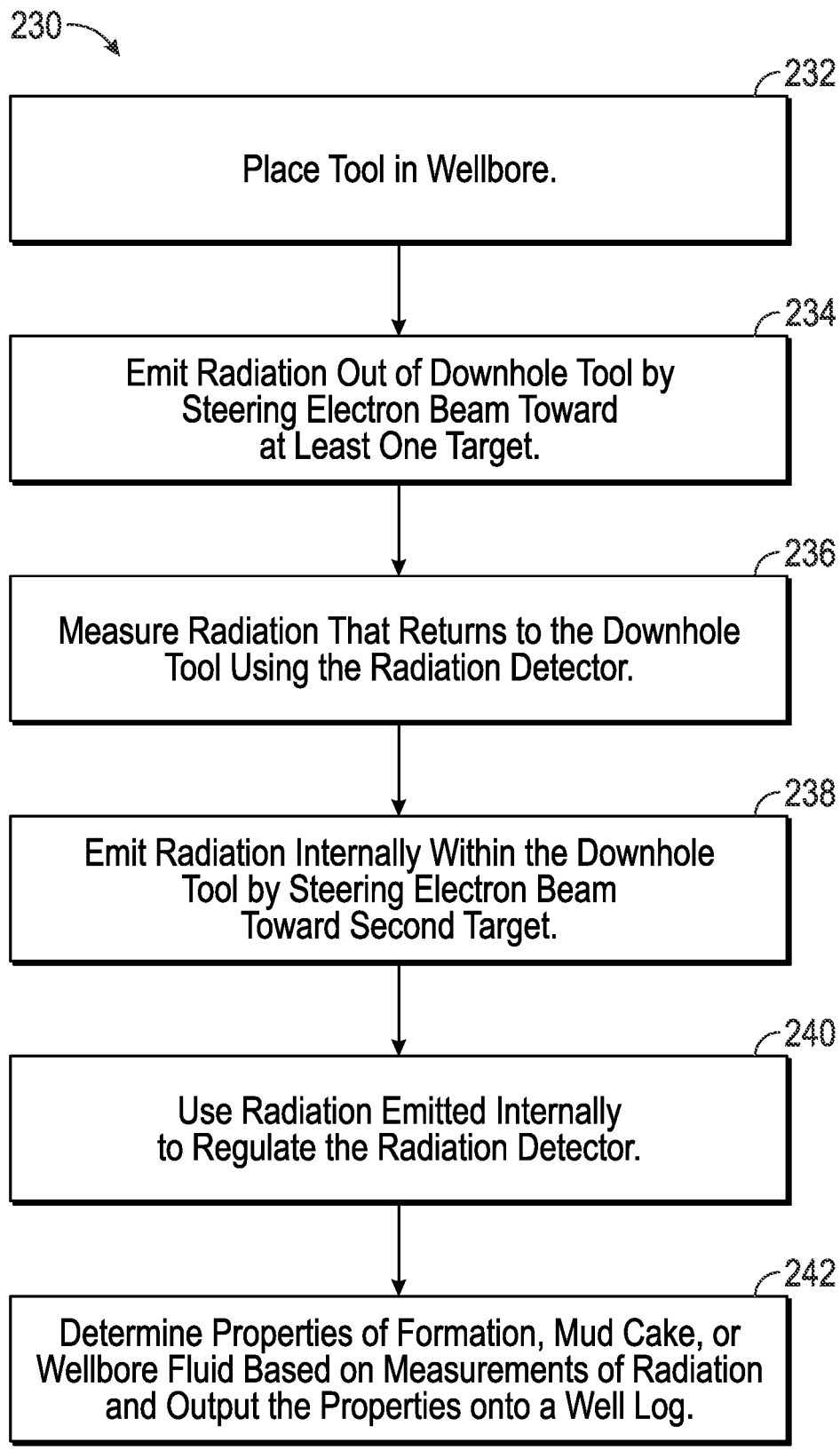
FIG. 12 is a flowchart of a method for obtaining measurements using radiation emitted by at least one target directed outside the downhole tool and radiation emitted internally to regulate a detector, in accordance with an embodiment.

In one embodiment, the downhole tool 12 may have two targets, one that emits radiation directed outside of the downhole tool (e.g., 50) and one that emits radiation directed internally to the downhole tool (e.g., 60). Some embodiments of the downhole tool 12 may have just those two targets, while other embodiments of the downhole tool have other targets as well (e.g., 52). FIG. 12 is a flowchart 230 representing a method for obtaining downhole properties using such a downhole tool 12. The downhole tool 12 may be placed in the wellbore (block 232) and an electron beam steered toward at least the first target (e.g., 50), causing radiation to be emitted out of the downhole tool 12 and toward the geological formation 14 (block 234). The detector 66 may detect the radiation that returns (block 236). Additional targets may be struck at different times to emit radiation to probe different DOIs if the downhole tool 12 includes the additional targets.

To enable gain regulation of the detector 66, the electron beam may be steered to the second target (e.g., 60), causing radiation to be emitted internally within the downhole tool 12 and toward the detector 66 (block 238). The detector 66 may detect this radiation, which will not have interacted with the materials outside the downhole tool 12, and thus may be well suited to be used for gain regulation (block 240) and for the stabilization and regulation of the accelerator high voltage. The measurements by the detector 66 based on radiation emitted from at least the first target (e.g., 50) may be used to determine any suitable properties, such as density, of the geological formation 14, the mud cake, or wellbore fluid, which may be output to a well log for viewing by an operator (block 242).

In a different embodiment the radiation emitted internally may come from more than one target (60 and another target (not shown)), where the absorber between the target and the detector is different for the two targets. The two different spectra generated by the s-ray radiation traversing the two targets may be used for improved gain stabilization and/or improved accelerator high voltage regulation.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

What is claimed is:

1. A downhole tool, comprising:
an electronic photon generator comprising:
a cathode configured to emit electrons;
a first target configured to generate x-ray photons when struck by the electrons;
a first collimation channel on a first side of the downhole tool configured to direct the x-ray photons generated by the first target into a geological formation, wherein the first target is adjacent to the first collimation channel;
a second target configured to generate x-ray photons when struck by the electrons;
a second collimation channel on the first side of the downhole tool configured to direct the x-ray photons generated by the second target into the geological formation, wherein the second target is adjacent to the second collimation channel; and
a beam steering device to direct the electrons to the first or second target; and
at least one detector configured to detect at least some of the x-ray photons emitted by the first target and at least some of the x-ray photons emitted by the second target,
wherein the first collimation channel is configured to direct the x-ray photons emitted by the first target out of the downhole tool at a first location on the first side of the downhole tool and into materials outside of the downhole tool,
wherein the second collimation channel is configured to direct the x-ray photons emitted by the second target out of the downhole tool at a second location on the first side of the downhole tool and into the materials outside of the downhole tool, and
wherein the first collimation channel is a first axial distance from the detector, the second collimation channel is a second axial distance from the detector, the first target is a third axial distance from the detector, the second target is a fourth axial distance from the detector, the first axial distance is less than the second axial distance, and the third axial distance is less than the fourth axial distance, thereby enabling the detector to achieve measurements of a first DOI based on x-ray photons emitted by the first target and measurements of a second DOI based on x-ray photons emitted by the second target.

2. The downhole tool of claim 1, wherein
the x-ray photons are directed out of the downhole tool by two or more targets and are scattered outside of the downhole tool and detected by the at least one detector; and the detected x-ray photons are analyzed to determine at least one of a formation density, formation photoelectric factor, mud cake thickness, mud cake photoelectric effect and borehole fluid density.

3. The downhole tool of claim 1, wherein
the x-ray photons are directed out of the downhole tool by two or more targets;
at least one of the first collimation channel or the second collimation channel directs the x-ray photons to a borehole fluid; and
the detected x-ray photons scattered from the borehole fluid are used to determine borehole fluid properties.

4. The downhole tool of claim 1, wherein the photon emitting device is an x-ray generator.

5. The downhole tool of claim 4, wherein the x-ray generator is equipped with an electron deflector and the electron deflector is controlled to direct the beam to a predetermined target.

6. The downhole tool of claim 5, wherein the electron deflector is an electrostatic deflector.

7. The downhole tool of claim 5, wherein the electron deflector is a magnetic deflector.

8. The downhole tool of claim 5, wherein the x-ray generator contains an aperture electrode.

9. The downhole tool of claim 5, wherein the electron deflector is controlled to irradiate each target for a time span that is optimized for decreasing the statistical error of the measurement.

10. The downhole tool of claim 1, wherein:
the first collimation channel has a first collimation channel angular collimation opening having a first size; and
the second collimation channel has a second collimation channel angular collimation opening having a second size which is different than the first size of the first collimation channel angular collimation opening.

11. The downhole tool of claim 10, wherein:
the first collimation channel angular collimation opening is surrounded by high Z material; and
the second collimation channel angular collimation opening is surrounded by high Z material.

12. The downhole tool of claim 1, wherein the first collimation channel and the second collimation channel have the same azimuth.

13. A method, comprising:
lowering a downhole tool into a wellbore penetrating a subterranean formation, said downhole tool comprises:
an electronic photon generator comprising:
a cathode configured to emit electrons;
a first target configured to generate x-ray photons when struck by the electrons;
a first collimation channel on a first side of the downhole tool configured to direct the x-ray photons generated by the first target into the subterranean formation, wherein the first target is adjacent to the first collimation channel;
a second target configured to generate x-ray photons when struck by the electrons;
a second collimation channel on the first side of the downhole tool configured to direct the x-ray photons generated by the second target into the subterranean formation, wherein the second target is adjacent to the second collimation channel; and
a beam steering device configured to direct the electrons to the first or second target; and
a detector configured to detect at least some of the x-ray photons emitted by the first target and at least some of the x-ray photons emitted by the second target, wherein the first collimation channel is a first axial distance from the detector, the second collimation channel is a second axial distance from the detector, the first target is a third axial distance from the detector, the second target is a fourth axial distance from the detector, the first axial distance is less than the second axial distance, and the third axial distance is less than the fourth axial distance, thereby enabling the detector to achieve measurements of a first DOI based on x-ray photons emitted by the first target and measurements of a second DOI based on x-ray photons emitted by the second target;
directing x-ray photons emitted by the first target out of the downhole tool at a first location on the first side of the downhole tool, wherein the x-ray photons emitted by the first target are emitted through the first collimation channel;
directing x-ray photons emitted by the second target out of the downhole tool at a second location on the first side of the downhole tool, wherein the x-ray photons emitted by the second target are emitted through the second collimation channel; and
determining a property of the downhole tool, the wellbore or the subterranean formation based on signals detected from the x-ray photons emitted by the first and second targets.

14. The method of claim 13, wherein the property is at least one of a formation density, formation photoelectric factor, mud cake thickness, mud cake photoelectric effect and borehole fluid density.

15. The method of claim 13, wherein:
the first collimation channel has a first collimation channel angular collimation opening having a first size to allow for a first depth of inspection; and
the second collimation channel has a second collimation channel angular collimation opening having a second size which is different than the first size of the first collimation channel angular collimation opening to allow for a second depth of inspection.

16. The method of claim 13, wherein the first collimation channel and the second collimation channel have the same azimuth.

* * * * *